United States Patent
Dubreuil (10) Patent No.: US 7,240,127 B2
(45) Date of Patent: *Jul. 3, 2007

(54) PROTECTED ETHERNET BACKPLANE COMMUNICATION

(75) Inventor: Claude Dubreuil, Ste-Marthe-sur-le-Lac (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 189 days.

This patent is subject to a terminal disclaimer.

(21) Appl. No.: 10/963,193

(22) Filed: Oct. 13, 2004

(65) Prior Publication Data

US 2005/0044137 A1    Feb. 24, 2005

Related U.S. Application Data

(63) Continuation of application No. 09/721,230, filed on Nov. 22, 2000, now Pat. No. 6,804,193.

(51) Int. Cl.
*G06F 15/16* (2006.01)

(52) U.S. Cl. .................................... 709/249

(58) Field of Classification Search ............... 709/249; 370/217, 445
See application file for complete search history.

(56) References Cited

U.S. PATENT DOCUMENTS

| | | | |
|---|---|---|---|
| 5,058,110 A | 10/1991 | Beach et al. | |
| 5,345,447 A | 9/1994 | Noel | |
| 5,428,806 A * | 6/1995 | Pocrass | 710/104 |
| 5,671,249 A | 9/1997 | Andersson et al. | |
| 5,754,800 A | 5/1998 | Lentz et al. | |
| 5,777,996 A | 7/1998 | Chan et al. | |
| 5,781,549 A | 7/1998 | Dai | |
| 5,802,278 A | 9/1998 | Isfeld et al. | |
| 5,872,904 A * | 2/1999 | McMillen et al. | 714/4 |
| 5,926,473 A * | 7/1999 | Gridley | 370/389 |
| 6,066,900 A * | 5/2000 | Chan et al. | 307/38 |
| 6,347,345 B1 * | 2/2002 | Cheon | 710/20 |
| 6,396,841 B1 | 5/2002 | Co et al. | |
| 6,611,526 B1 | 8/2003 | Chinnaswamy et al. | |
| 6,804,193 B1 * | 10/2004 | Dubreuil | 370/217 |

FOREIGN PATENT DOCUMENTS

EP    0952702    10/1999

* cited by examiner

*Primary Examiner*—Jason Cardone
*Assistant Examiner*—Minh-Chau Nguyen (57) ABSTRACT

A multiprocessor system is provided that has a plurality of processor modules coupled together via a backplane. The system comprises a first processor module having a first processor and a first switch, the first switch being operable to route data packets. The system also comprises a second processor module having a second processor and a first communication device that is operable to communicate with the first switch via a first communication path on the backplane. In addition, the system comprises a third processor module having a third processor and a second communication device that is operable to communicate with the first switch via a second communication path on the backplane. The first switch is operable to route data packets from one of the first, second, or third processors to another of the first, second, or third processors.

3 Claims, 7 Drawing Sheets

*Fig. 10*

PROTECTED ETHERNET BACKPLANE COMMUNICATION

CROSS REFERENCE TO RELATED APPLICATION

This application is a continuation of and claims the benefit under 35 U.S.C. §120 of U.S. patent application Ser. No. 09/721,230 entitled "Protected Ethernet Backplane Communication" and filed on Nov. 22, 2000 now U.S. Pat. No. 6,804,193. This application also incorporates copending U.S. patent application Ser. No. 09/721,230 by reference as if fully rewritten here.

FIELD

The systems and methods described herein relates in general to communication between multiple data processors and, more particularly, to communication between multiprocessors using a switch protocol.

BACKGROUND

Communication between computers has become an important aspect of everyday life in both private and business environments. Computers converse with each other based upon a physical medium for transmitting the messages back and forth, and upon a set of rules implemented by electronic hardware attached to and programs running on the computers. These rules, often called protocols, define the orderly transmission and receipt of messages in a network of connected computers.

The use of multiple processors in a single system is well-known in the field of data processing systems, and the resulting systems are called multiprocessor systems. As data processing systems have expanded to incorporate multiprocessors, communication systems for allowing communication between the multiple processors have been proposed. The multiprocessor communication systems must be continually improved to allow for greater data processing capacity and faster speeds the multiprocessor environment is capable of delivering.

SUMMARY

A method and system is provided for inter-processor communication in a backplane based multiprocessor system. In one exemplary system, a multiprocessor system has a plurality of processor modules coupled together via a backplane. The system comprises a first processor module having a first processor and a first switch, the first switch being operable to route data packets. The system also comprises a second processor module having a second processor and a first communication device that is operable to communicate with the first switch via a first communication path on the backplane. In addition, the system comprises a third processor module having a third processor and a second communication device that is operable to communicate with the first switch via a second communication path on the backplane. The first switch is operable to route data packets from one of the first, second, or third processors to another of the first, second, or third processors.

DETAILED DESCRIPTION

Figure 1:
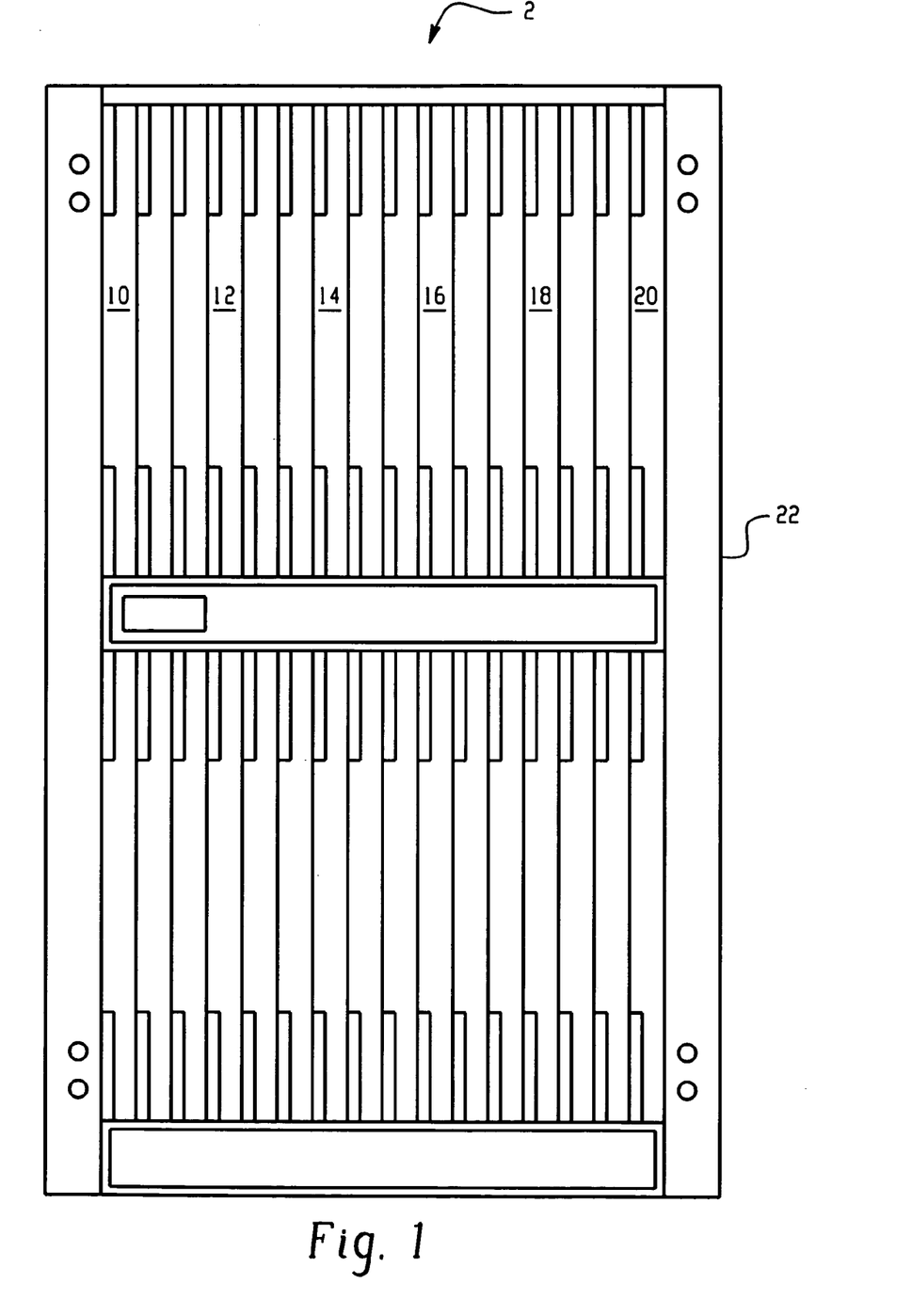
FIG. 1 is a front view of an exemplary backplane base multiprocessor system.
Figure 2:
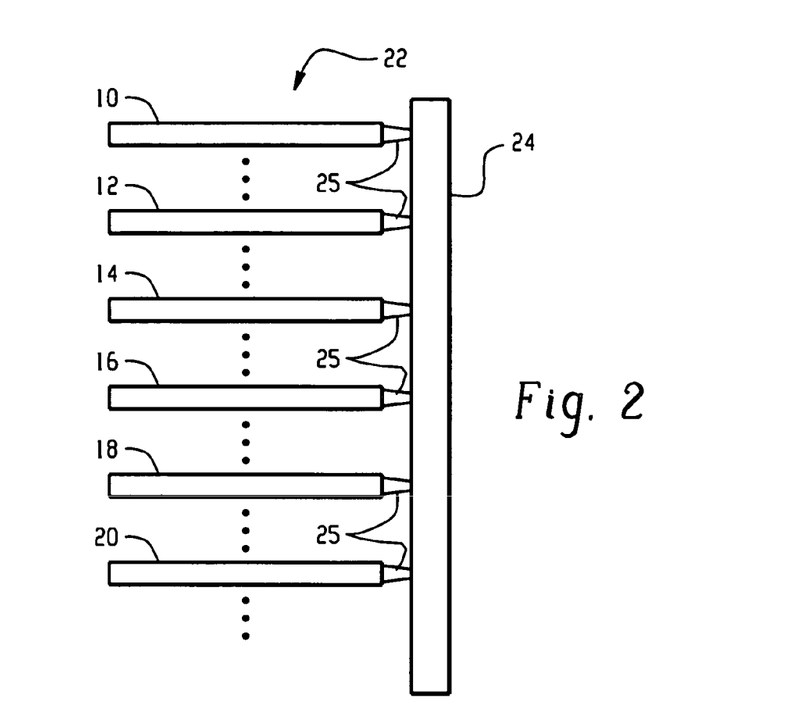
FIG. 2 is a schematic view of an exemplary backplane based multiprocessor system.

Referring now to the figures, FIG. 1 shows an exemplary backplane based multiprocessor system 2 comprising a plurality of processor modules 10, 12, 14, 16, 18, and 20 that are mounted in a shelf 22. As shown in FIG. 2, the shelf 22 contains a backplane 24 which provides a physical media for allowing the modules 10, 12, 14, 16, 18, and 20 to communicate with each other. Each module 10, 12, 14, 16, 18, and 20 includes a connector 25 for providing electrical communication pathways between the backplane 24 and components on the processor modules 10, 12, 14, 16, 18, and 20.

Figure 3:
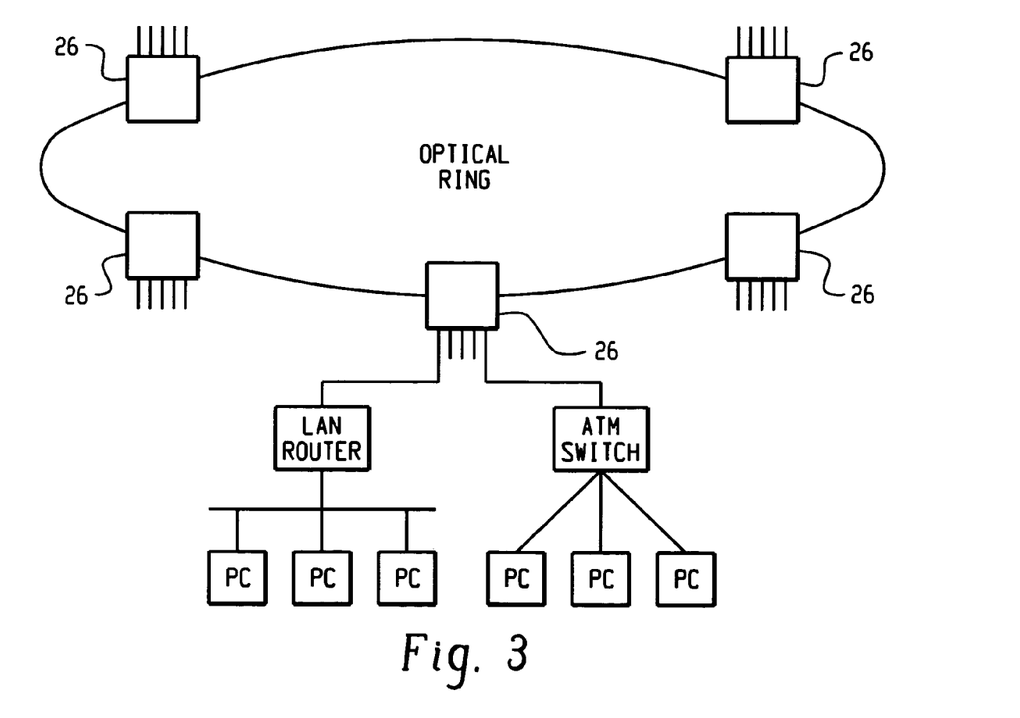
FIG. 3 is a block diagram of a ring network.

As shown in FIG. 3, the exemplary multiprocessor system 2 is a multiple services carrier node 26 that can be used in networks carrying frame-, packet-, and cell-based traffic. The processor modules in this node 26 are either traffic carrying modules, i.e., modules that carry IP or ATM traffic to or from the node, or cross-connect modules, i.e., modules that pass IP or ATM traffic from one traffic carrying module to another traffic carrying module.

Figure 4:
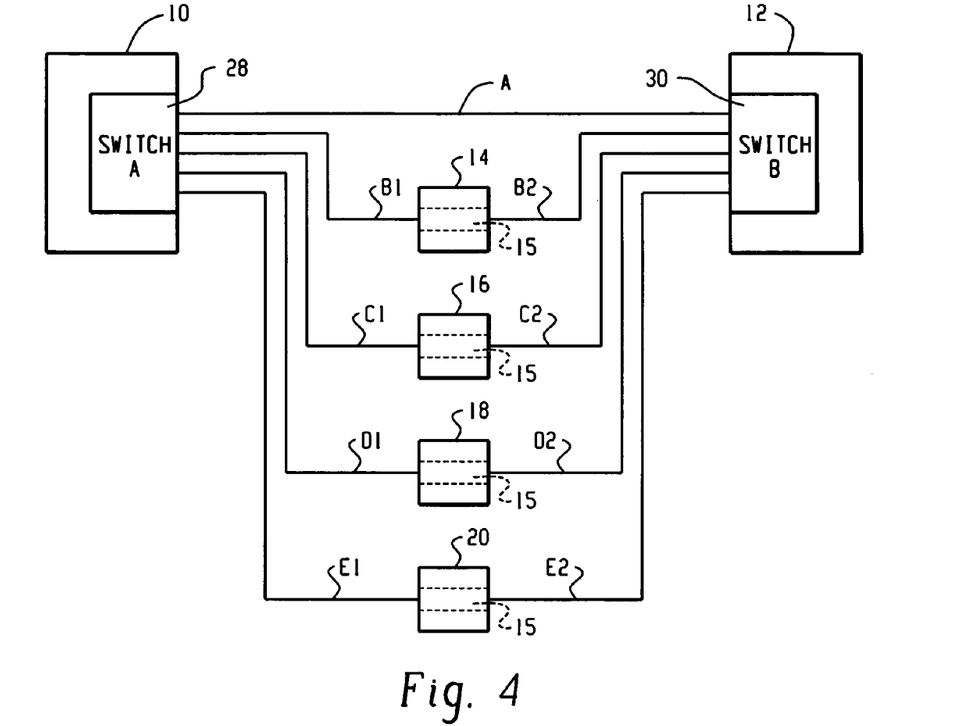
FIG. 4 is a block diagram showing an exemplary coupling arrangement.

As shown in FIG. 4, processor modules 10, 12, 14, 16, 18, and 20 are interconnected to allow for inter-processor communication. The communication scheme is based on an Ethernet protocol that is implemented using a different physical media, the backplane. Each processor module includes a device that allows the processor module to communicate over the backplane.

The exemplary multiprocessor system includes a set of redundant switches 28 and 30 that interconnect processor modules 10, 12, 14, 16, 18, and 20 via the backplane. Switches 28 and 30 could optionally reside on one or more of the processor modules 10, 12, 14, 16, 18, and 20 or could optionally reside on a separate module. In the illustrated embodiment, switches 28 and 30 reside on processor modules 10 and 12, respectively, referred to hereinafter as the system processor modules. The switches 28 and 30 are the devices for backplane communication for the system processor modules.

The other processor modules 14, 16, 18, and 20, referred to hereinafter as the line processor modules, each include an output communication device 15 for backplane communication. In the exemplary system, each communication device 15 is coupled to each switch 28 and 30 via a dedicated communication channel on the backplane. In the illustrated embodiment, the communication device 15 of processor module 14 is coupled to switch A via channel B1 and coupled to switch B via channel B2. The other line processor modules are similarly coupled. Finally, switch A and switch B are coupled to each other via channel A. Inter-processor communication is accomplished by the switches 28 and 30 passing data traffic from one processor module to another via the dedicated communication channels.

Figure 5:
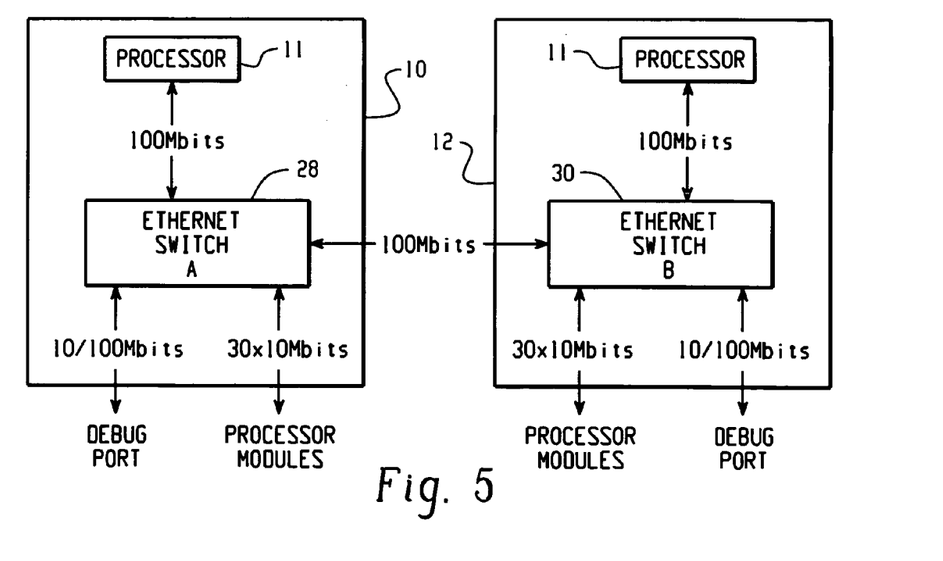
FIG. 5 is a block diagram of exemplary system processor modules.

As shown in FIG. 5, the exemplary system processor modules 10 and 12 each include a high speed communication link, preferably 100 Mbits/s, between the on-board processor 11 and the on-board switch. Each switch 28 and 30 includes a plurality of ports. One port is coupled to a high speed link A, preferably 100 Mbits/sec, that provides a high speed communication path between the switches. In addition, each switch 28 and 30 has a plurality of ports that are coupled to communication channels to the line processor modules 14–20. Optionally, each switch 28 and 30 could include a debug port.

The exemplary Ethernet switches 28 and 30 allow a processor on one of the processor modules to communicate with a processor on another of the processor modules. The exemplary protocol used for the communication is a modified Ethernet protocol. Because Ethernet is a widely known protocol and many CPUs have built-in media access controllers, the exemplary system provides a versatile and less complex system for inter-processor communication in a multiprocessor environment.

Communication between processor modules in the exemplary system is via data packets that are formatted using an Ethernet media access control (MAC) protocol. Ethernet protocols and Ethernet MAC are well-known.

The physical media for communication includes the backplane which provides the communication channels and the processor module connectors 25. The I/O communication devices 15 and the switches 28 and 30 contain the circuitry to provide for the transmission of data over the communication channels.

Figure 6:
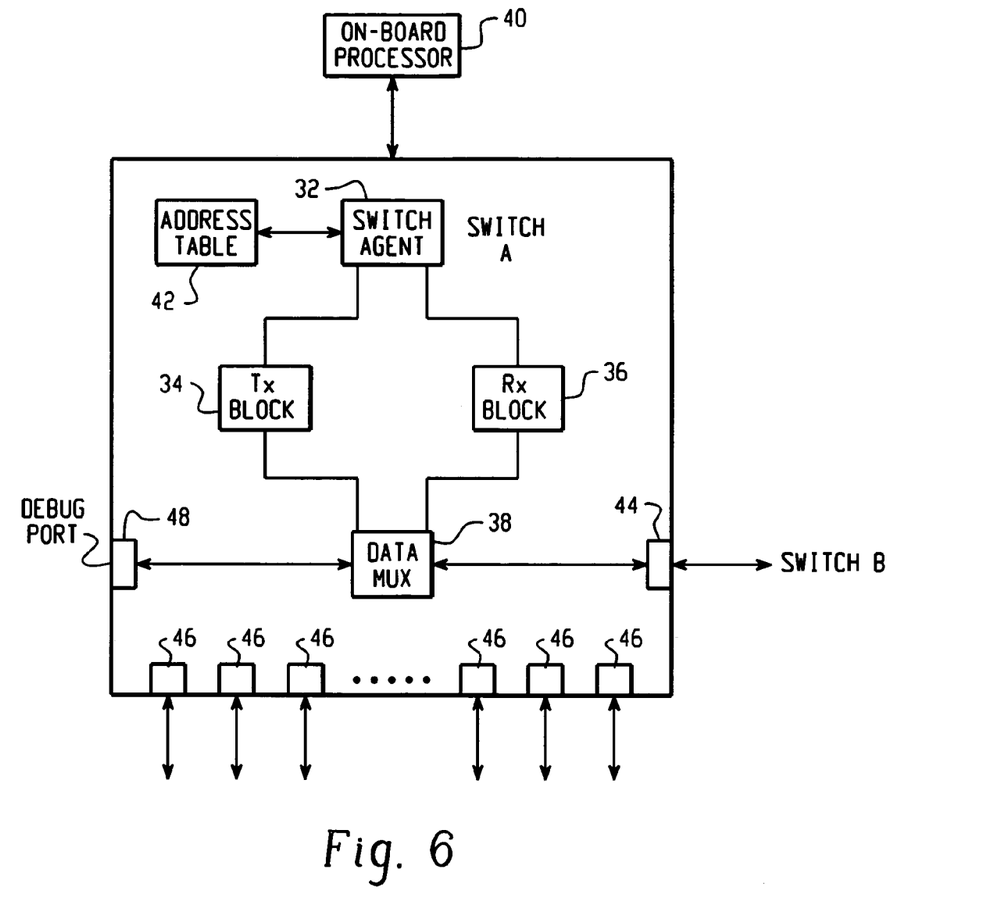
FIG. 6 is a block diagram of an exemplary line processor module and its communication device.

As shown in FIG. 6, each exemplary switch 28 includes a switch agent 32, a transmitter block 34, a receiver block 36, and a data multiplexor 38. The switch agent 32 communicates with the on-board processor 40 to transfer data and instructions between the two. The switch agent 32 also sends data packets to the transmitter block 34 for transmission to another processor module and receives data packets from the receiver block 36 that were sent by another processor module. The switch agent 32 also has access to an address table in which it stores the addresses of the processor modules with which it can communicate.

The transmitter block 34 forwards data packets to a multiplexor 38 which routes the data packets to the port 46 assigned to the recipient of the message. The multiplexor 38 also forwards data packets received from a port 46 to the receiver block. The multiplexor 38 is also capable of forwarding data packets to and from the debug port 48 and the high speed communication port 44 to the other switch.

Figure 7:
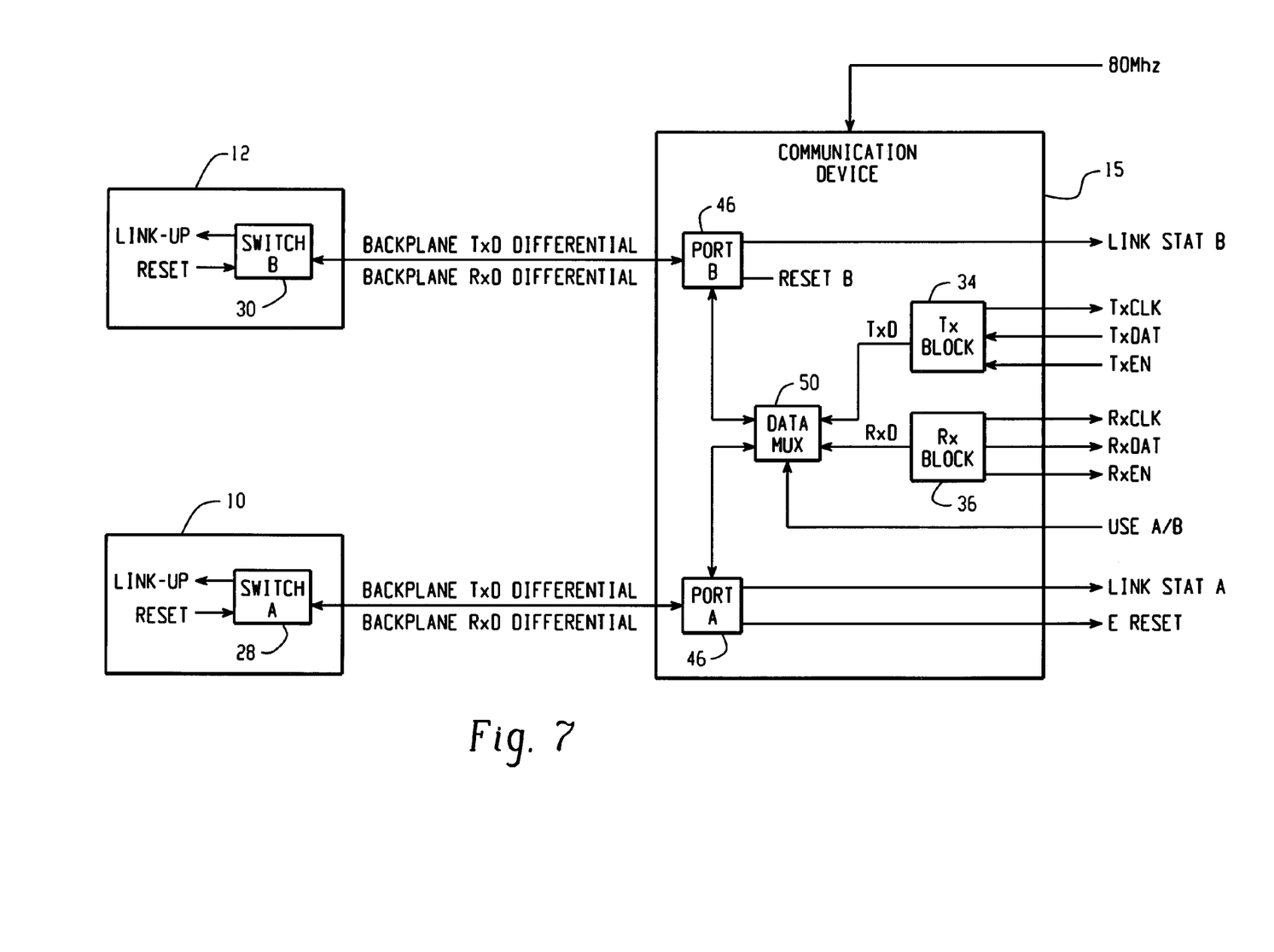
FIG. 7 is a block diagram of an exemplary communication device.

As shown in FIG. 7, the communication devices 15 for the line processor modules include a transmitter block 34, a receiver block 36, a data multiplexor 50, and two I/O ports 46. The exemplary line processor modules use a PowerQUICC (MPC860) processor, which already has a built-in Ethernet MAC. The MAC address does not need to come from a configuration memory on the board. The MAC address can be constructed based on a fixed number, and the slot ID in which the module physically resides.

The transmitter block 34 forwards data packets from the on-board processor to the data multiplexor 50. The receiver block forwards data packets from the data multiplexor 50 to the on-board processor. The data multiplexor 50 selects which of the two ports 46 data packets are to be forwarded to from the transmitter. The on-board processor instructs the data multiplexor 50 to select a particular port via the use A/B line.

The I/O ports 46 are coupled to the communication channel and transfers data thereon. Functionally, the I/O ports 46 are the same on both the switches 28 and 30 and on the communication devices 15. The communication channels have two data paths, an upstream path with a direction of data flow from a communication device to a switch and a downstream path with a direction of data flow from a switch to a communication device. Because the data sent over the paths are differential signals, each communication channel requires four lines, two for each path.

Figure 8:
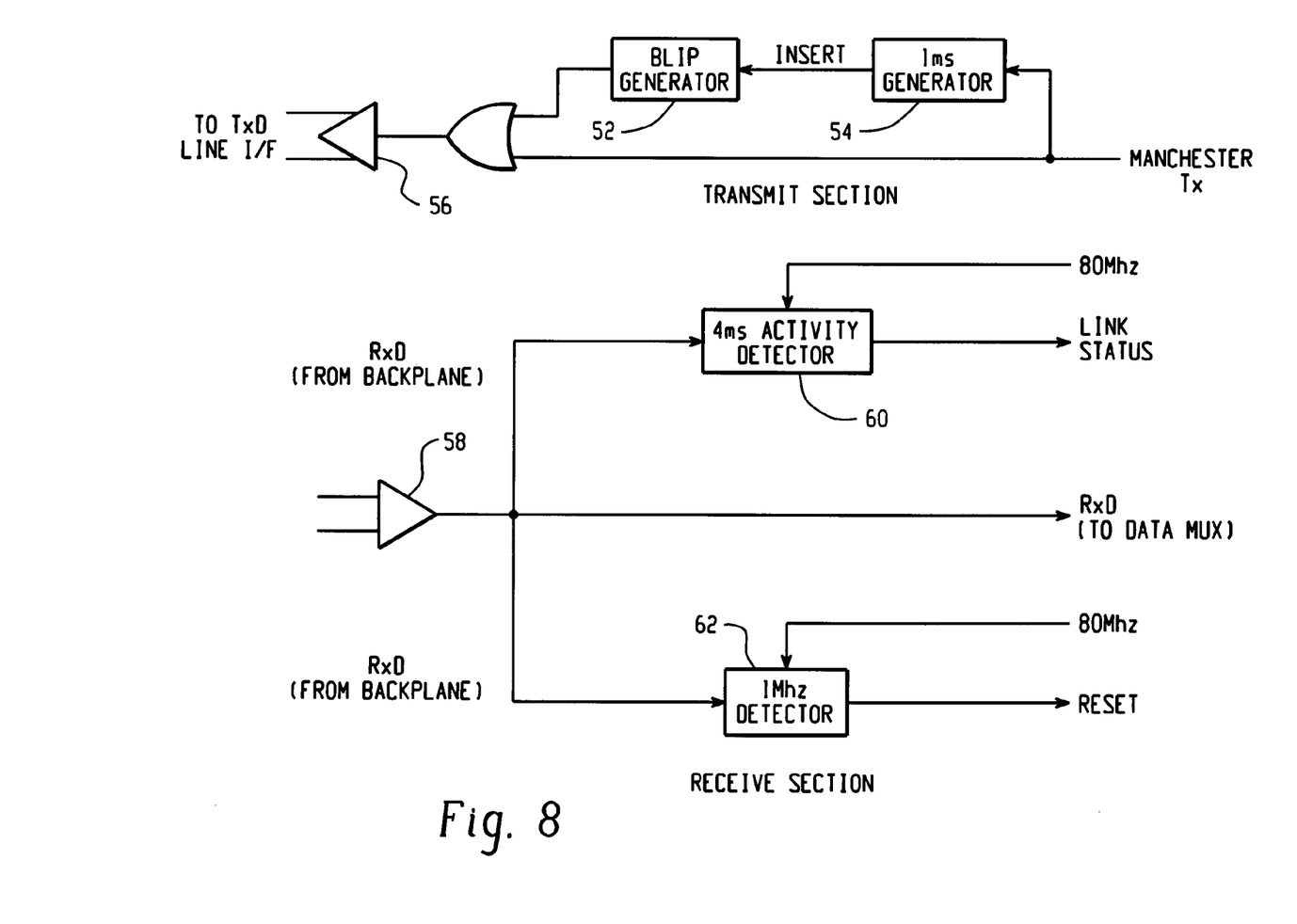
FIG. 8 is a block diagram of an exemplary I/O port.

As shown in FIG. 8, the I/O ports 46 include a transmit section and a receive section. The transmit section transfers data from the data multiplexor 50 to the upstream path of the communication channel as a differential signal via a differential driver 56. The transmit section also includes a blip generator 52 that generates a blip on the upstream path after each millisecond of inactivity on the data path. A blip is a simple '1', Manchester encoded signal. It is not long enough to activate the detector (it lacks the Ethernet preamble), but it does trigger the activity detector that says the switch at the remote end is there and available. A 1 ms detector 54 monitors the port to determine if a millisecond has passed since the last blip or transmission of data packets and signals the blip generator 52 to generate a blip when a millisecond has passed. This blip generation mechanism is used by the switch to determine if the communication channel is available.

The receive section of the I/O port 46 includes a differential receiver 58 for receiving data packets from the downstream data path and forwarding it to the receiver block via the data multiplexor. The receive section also includes a 4 millisecond activity detector 60 and a 1 Mhz detector 62. The activity detector 60 detects whether there has been activity, either data packets or a blip, on the data path within the past 4 milliseconds and communicates this information to the on-board processor as the link status. The 1 Mhz detector 62 looks for a special 1 Mhz pattern on the receive data, such as a Manchester encoding is invalid pattern and outputs a reset pulse to the processor if one is received.

Figure 9:
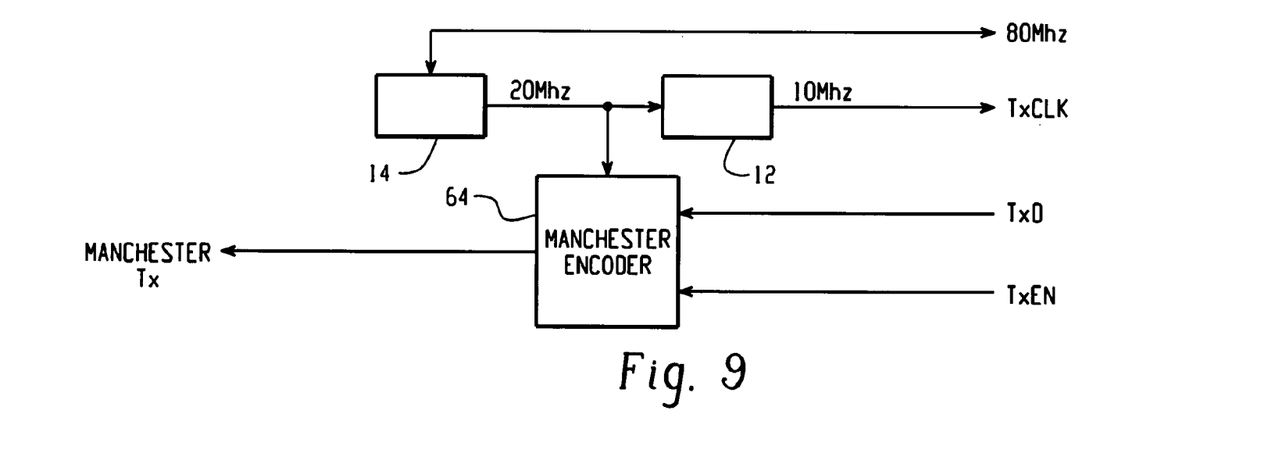
FIG. 9 is a block diagram of an exemplary transmitter block.

An exemplary transmitter block 34 is shown in block diagram form in FIG. 9. The transmitter block 34 receives data packets from the on-board processor, encodes the bits using the Manchester encoder 64 and transmits the Manchester encoded data packets to the data multiplexor 50 (shown in FIG. 7) for forwarding to the active I/O port 46. The transmitter block 34 also generates a 20 Mhz clock signal from a 80 Mhz source for use by the Manchester decoder 64 and a 10 Mhz clock for use by the processor when transmitting the data packet.

Figure 10:
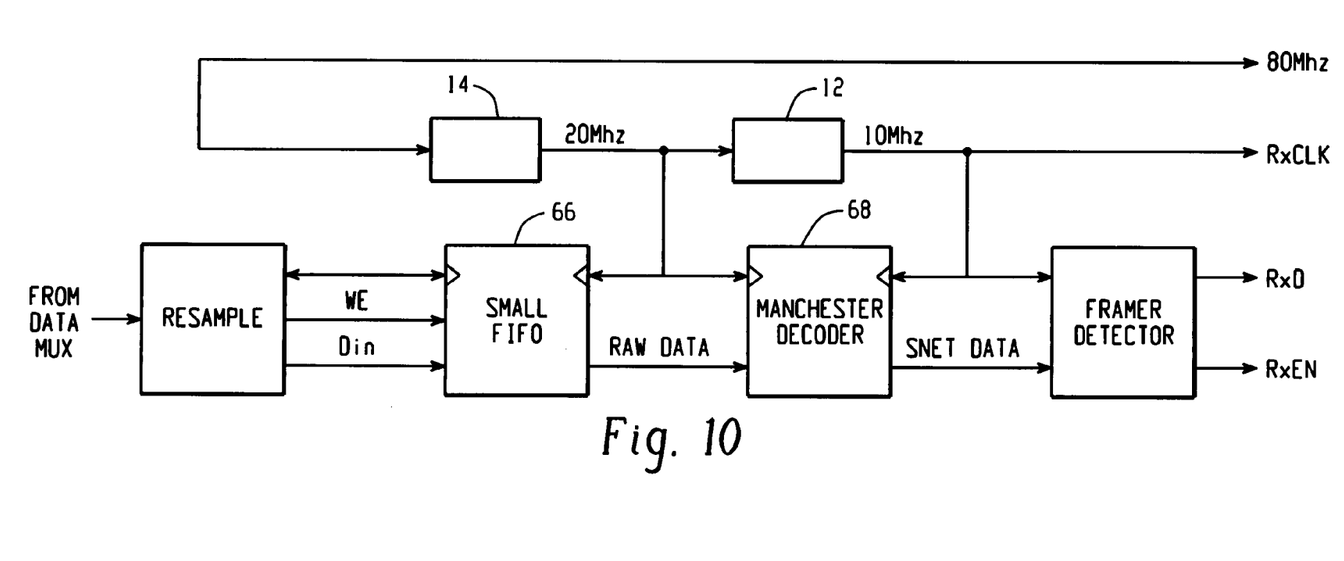
FIG. 10 is a block diagram of an exemplary receiver block.

An exemplary receiver block 36 is shown in block diagram form in FIG. 10. Received data is received from the I/O port 46 via the data multiplexor. Using a local high-speed clock, the received data is first oversampled, and stored in a small FIFO 66. Resampling is re-synchronized on each data edges, which will give 3, 4 or 5 samples per data bit. The data is then Manchester decoded via a Manchester decoder 68, and passed on to the Ethernet MAC along with the RxEN (data present) status.

The exemplary system includes a switch that requires less physical space and uses fewer heat generating components than traditional Ethernet switches because of the use of fewer analog circuits. In traditional Ethernet switches a lot of physical space is devoted to the analog physical components and to heat dissipation resulting from the analog physical components. For example, traditional Ethernet switches use analog signal treatment methods for signal shaping, filtering, etc. Traditional switches also implement analog phase locked loops (PLLs) for clock recovery and magnetics for isolation. The exemplary system uses Manchester encoding, like in traditional switches, but eliminates signal shaping and the need for a PLL and magnetics.

Normally, the Ethernet clock is 10 Mhz. On the communication device 15, since there is no 10 Mhz analog PLL, a simple Digital PLL is implemented using an 8x-oversampling clock, i.e. 80 Mhz. Since data is transmitted via Manchester encoding, the clock and data is combined into a single signal and that signal is transferred as LVDS levels over the backplane. The clock recovery from the combined clock/data signal is via a digital mechanism and not through the use of a PLL. The clock recovery is performed using an ×8 clock (80 Mhz). Essentially, the signal is sampled at 80 Mhz, and converted to 10 Mbit clock by determining the signal transition edges. In the exemplary system the clock recovery is entirely digital and can be implemented in a low cost device such as a field programmable gate array (FPGA).

The exemplary systems also has a built-in remote processor reset feature. A special pattern (1 Mhz) can be sent from the system processor modules to the line processor modules to cause the line processor modules to reset. The communication devices 15 are configured to activate a reset command when they receive a "special" invalid pattern on the physical link, preferably a 1 Mhz clock. The communication devices 15 will not recognize the special pattern as normal data because it is an invalid signal in Ethernet world, but the communication devices will detect it and reset the processor. In the exemplary system, the reset pattern will only be listened for on the link coming from switch A. Any reset patterns received from switch B will be ignored. Also, in the exemplary system, the reset "detection" is active at all time. Reset detection is active even when the link status is down. This remote processor reset command allows for the line processor modules to be reset without having to send a technician out to perform this function.

In the exemplary system, each Ethernet interface on the line processor modules has access to two different Ethernet physical links, for redundancy. The two switches 28 and 30 provide the redundancy. When both system processor modules are operational, the line processor modules can communicate with either switches 28 or 30 without any difference in performance. When the link with one of the system processor modules is down, the line processor module will choose to communicate using the other link. Control over which switch the line processor module connects with is implemented using the UseA/B control line as shown in FIG. 7.

The exemplary system includes a link active mechanism for keeping track of active links between line processor modules and the switches 28 and 30. The communication devices 15 are responsible for providing a minimum level of activity on each of the links, regardless of whether the link is the active link or the standby link.

On the transmit side, a link is kept "active" by the transmit section of the I/O port 46 sending a blip signal after one milliseconds of inactivity. On the standby link, the blip will be transmitted every millisecond. On the active link, the blip will start transmitting each 1 millisecond after the last transmission and will continue until traffic resumes. The communication devices 15 will communicate to the on-board processor, the link status with respect to each switch.

On the receive side, if the receive section of the I/O port 46 does not detect activity on the link after 4 milliseconds (complete silence), the link is declared down. It will be declared up and ready for use when activity is detected again.

The structural arrangements and steps described herein and shown in the drawings are examples of structures, systems, or methods having elements or steps corresponding to the elements or steps of the invention recited in the claims. This written description and drawings may enable those skilled in the art to make and use embodiments having alternative elements or steps that likewise correspond to the elements or steps of the invention recited in the claims. The intended scope of the invention thus includes other structures, systems, or methods that do not differ from the literal language of the claims, and further includes other structures, systems, or methods with insubstantial differences from the literal language of the claims.

What is claimed is:

1. A multiprocessor system having a plurality of processor modules coupled together via a backplane, comprising:
    a first processor module having a first processor and a switch;
    a second processor module having a second processor and a first communication device that is operable to communicate with said switch via a first communication path on the backplane; and
    a third processor module having a third processor and a second communication device that is operable to communicate with said switch via a second communication path on the backplane; and
    wherein the switch is operable to route data packets from one of said first, second or third processors to another of said first, second or third processors.

2. A multiprocessor system having a plurality of processor modules coupled together via a backplane, comprising:
    a first processor module having a first processor and a first switch, said first switch being operable to route data packets;
    a second processor module having a second processor and a second switch, said second switch being operable to route data packets; and
    a third processor module having a third processor and a first communication device that is operable to communicate with said first switch via a first communication path on the backplane and operable to communicate with said second switch via a second communication path on the backplane; and
    wherein said first switch is operable to route data packets from one of said first, second, or third processors to another of said first, second, or third processors; and
    wherein said second switch is operable to route data packets from one of said first, second, or third processors to another of said first, second, or third processors.

3. A system for facilitating communication between a plurality of processor modules in a multi-processor system, comprising:
    a backplane that provides a plurality of communication paths for coupling the processor modules,
    a first processor module having a first processor and a first switch, said first switch being operable to route data packets;
    a second processor module having a second processor and a second switch, said second switch being operable to route data packets;
    a third processor module having a third processor and a first communication device that is operable to communicate with said first switch via a first communication path on the backplane and operable to communicate with said second switch via a second communication path on the backplane; and
    wherein said first switch is operable to route data packets from one of said first, second, or third processors to another of said first, second, or third processors; and
    wherein said second switch is operable to route data packets from one of said first, second, or third processors to another of said first, second, or third processors.

* * * * *